United States Patent [19]

Vu et al.

[11] Patent Number: 5,130,205
[45] Date of Patent: Jul. 14, 1992

[54] LAMINATE AND GAS PERMEATION MODULE COMPRISING TWO-COMPONENT POLYURETHANE ADHESIVE

[75] Inventors: Cung Vu, Columbia; Jalandar Y. Jadhav, Ellicott City, both of Md.

[73] Assignee: W. R. Grace & Co.-Conn., New York, N.Y.

[21] Appl. No.: 696,890

[22] Filed: May 8, 1991

Related U.S. Application Data

[62] Division of Ser. No. 364,761, Jun. 12, 1989, Pat. No. 5,041,517.

[51] Int. Cl.$^5$ .................. B32B 9/04; B32B 27/08; B32B 27/34; B32B 27/40
[52] U.S. Cl. .................. 428/475.5; 428/543; 427/245; 528/60; 252/182.2; 252/182.22
[58] Field of Search .............. 427/245; 428/475.5, 428/543; 528/60; 252/182.2, 182.22

[56] References Cited

U.S. PATENT DOCUMENTS

| | | | |
|---|---|---|---|
| 3,159,604 | 12/1964 | Rudkin, Jr. et al. | 528/60 |
| 3,300,370 | 1/1967 | Epstein et al. | 428/475.5 |
| 3,386,962 | 6/1968 | Damusis | 528/60 |
| 3,714,127 | 1/1973 | Fabris et al. | 528/60 |
| 3,725,355 | 4/1973 | Parrish et al. | 528/55 |
| 4,130,403 | 12/1978 | Cooley et al. | 55/16 |
| 4,330,494 | 5/1982 | Iwata et al. | 428/117 |
| 4,409,383 | 10/1983 | Zalucha et al. | 428/426 |
| 4,444,846 | 4/1984 | Zalucha et al. | 428/425.6 |
| 4,444,976 | 4/1984 | Rabito | 528/60 |
| 4,469,616 | 9/1984 | Hostettler | 528/52 |
| 4,487,909 | 12/1984 | Coughlin et al. | 528/60 |
| 4,507,336 | 3/1985 | Cenegy | 427/244 |
| 4,559,239 | 12/1985 | Cenegy | 427/140 |
| 4,680,203 | 7/1987 | Maki et al. | 427/393.6 |
| 4,788,269 | 11/1988 | Vu et al. | 528/60 |
| 4,804,734 | 2/1989 | Vu et al. | 528/54 |
| 4,855,185 | 8/1989 | Vu et al. | 528/60 |
| 4,857,561 | 8/1989 | Mafoti et al. | 528/60 |
| 4,859,735 | 8/1989 | Vu et al. | 528/58 |
| 5,041,517 | 8/1991 | Vu et al. | 528/60 |

*Primary Examiner*—John Kight, III
*Assistant Examiner*—Rabon Sergent
*Attorney, Agent, or Firm*—Valerie E. Looper; Steven T. Trinker

[57] ABSTRACT

A polyol is reacted with a polyisocyanate prepolymer to make a polyurethane. The polyol is the reaction product of trimethylol propane with ethylene oxide (1:3 molar). The polyisocyanate prepolymer is the reaction product of poly(ethylene adipate) with MDI. The novel polyurethane is stable in both aliphatic and aromatic hydrocarbons and is especially useful in bonding together laminates of nylon-supported permeable membranes. The laminates are used in modules for separation of hydrocarbon-containing gases.

11 Claims, 2 Drawing Sheets

LAMINATE AND GAS PERMEATION MODULE COMPRISING TWO-COMPONENT POLYURETHANE ADHESIVE

This is a division of application Ser. No. 364,761, filed Jun. 12, 1989, now U.S. Pat. No. 5,041,517.

FIELD OF THE INVENTION

The invention relates in general to a novel polyurethane, its preparation and its use as a coating and adhesive. Specific uses include adhesives for membranes in gas permeation modules 1. Related Applications Ser. No. 209,406, filed May 19, 1988, Vu et al, entitled "Liquid Coatings for Bridge Deckings and the Like"; and Ser. No. 245,869, filed Sep. 16, 1988, Vu, entitled "Castor Oil Based Polyurethane for Bridge Deck and Related Applications", describe polyurethane resins made from specific polyols and polyisocyanates. Both are owned by the assignee of the instant application.

2. Prior Art

U.S. Pat. No. 4,788,269, Vu et al, discloses polyurethanes made by reaction of certain low-molecular weight polyols with modified diphenylmethane diisocyanates (MDI). That patent describes a number of polyurethanes which are disclosed in other U.S. Pat. Nos., including 4,608,203; 4,559,239; 3,725,355 and 4,507,336. So far as applicants are aware, however, the prior art does not describe the polyurethane hereinafter described.

Gas permeation modules and laminates used for separation of components in hydrocarbon gas streams are well known. See, e.g., U.S. Pat. No. 4,130,403 and Canadian Patent No. 1,107,659. See also GRACE MEMBRANE SYSTEMS (1988), published by W. R. Grace & Co.-Conn., Houston, Tex.

BRIEF SUMMARY OF THE INVENTION

It is one object of the invention to prepare a novel polyurethane, made by reacting specific polyols and polyisocyanates. In carrying out this reaction, the polyol will be present in a reactant designated as Component A and the polyisocyanate will be in a reactant designated as Component B, wherein Component A and Component B are two separate components to be mixed.

It is another object of the invention to provide a novel polyurethane adhesive for bonding laminates of permeable membranes supported on nylon fabrics, as well as making and using gas permeation modules incorporating the laminates.

It is yet another object of the invention to provide a novel polyurethane adhesive which meets the essential requirements of a bonding material for gas separation laminates:

It is liquid at ambient temperatures.
It cures at ambient temperatures in 24 hours.
It has a reasonable pot life (at least 45 minutes).
It is easily applied by simple equipment, such as a caulking gun.
It is flexible when cured.
It has good nylon-to nylon fabric peel strength.
It has excellent resistance to hydrocarbon solvents.

These and other objects such as protective and adhesive coatings for other substrates will be apparent from the following detailed description.

DETAILED DESCRIPTION OF THE INVENTION

Figure 1:
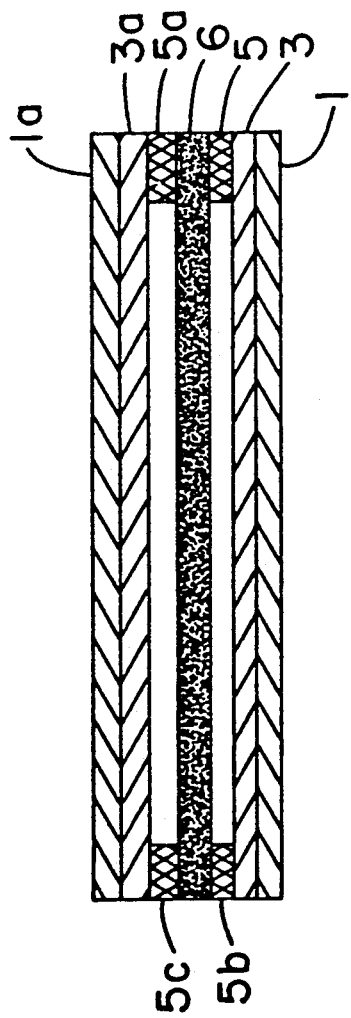
FIG. 1 illustrates a laminate of the invention in transverse cross section. The vertical scale is out of proportion for illustrative purposes.

The novel polyurethane adhesive is the reaction product of two basic components for polyurethane compositions, viz., a polyol (Component A) and a polyisocyanate (Component B).

The Polyol

The polyol can be made in a manner well known in the art by reacting trimethylol propane with ethylene oxide in a 1:3 molar ratio. The resulting product contains at least about 95 mole % of $C_2H_5-C(R)_3$ with the balance being up to about 5 mole % $C_2H_5-C(R')(R)_2$ where R is $-CH_2-O-CH_2-CH_2OH$ and R' is $-CH_2-O-CH_2-CH_2-O-CH_2CH_2-OH$. Such polyols are available commercially as Isonol 93 from Dow Chemical Co.

The Polyisocyanate

The polyisocyanate is an isocyanate-terminated prepolymer derived from poly(ethylene adipate) and diphenylmethane diisocyanates (MDI). Such polyisocyanates are available commercially as Baytech MS.090 from Mobay Corporation and can be made by conventional procedures, e.g., adipic acid is reacted with ethylene glycol to give hydroxy-terminated poly(ethylene adipate), i.e. $HO-CH_2CH_2[O-C(:O)(CH_2)_4C(:O)-O-CH_2CH_2]_n-OH$. The resulting ester is then reacted with MDI (4,4'-diphenylmethane diisocyanate) to give $R''-CH_2CH_2[O-C(:O)(CH_2)_4C(:O)-O-CH_2CH_2]_n-R''$, where R'' is

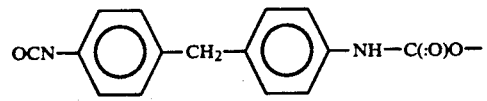

and n is about 2-4.

A mixture of polymeric MDI and MDI isomers can be added to the aforesaid isocyanate-terminated prepolymer, especially when it is desirable to reduce viscosity of the polyisocyanate component and of the resulting polyurethane. Such mixture is available commercially as PAPI®94 (now known as PAPI 2094) from Dow Chemical Co. PAPI 94 consists essentially of components (i) and (ii), wherein (i) and (ii) are present in about 60%-70% and 30%-40% by weight respectively. Component (i) comprises two MDI isomers, viz., 88% of 4,4'-diphenylmethane diisocyanate and 12% 2,4'-diphenylmethane diisocyanate. Component (ii) is polymeric MDI, viz.,

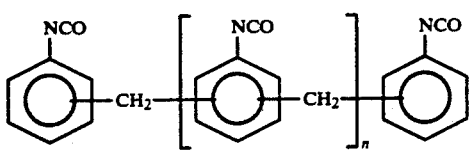

having a functionality of 3, where n is a variable usually between 1 and 3, and possibly as high as 8.

In addition, Component A may include ingredients other than polyols, and Component B may contain ingredients other than isocyanate-terminated prepolymer. For instance, if desired, a conventional polyurethane catalyst can be added (to speed the reaction of A with B) in amounts of 0.005–0.5 weight % of the total compositions of A and B. If used, the catalyst is mixed into Component A.

In the following examples the operable weight ratio range of A:B is about 1:2–7, however a ratio of about 1:3–5 is preferred. Further these examples are merely illustrative and should not be construed to limit the scope of the invention described herein.

EXAMPLE 1—BASIC FORMULATION AND APPLICATION

Component A: polyol (Isonol 93), 18.5 g.
Component B: polyisocyanate prepolymer (Baytec MS.090), 100.0 g.

A and B were intimately mixed to form a viscous polyurethane semi-fluid, which is applied as a bead from a caulking gun to bond borders of a nylon laminate, where the laminates are used as supports for cellulose acetate membranes. The nylon is nylon 6—6 fabric, about 7 mils thick. The cellulose acetate is conventional gas permeate membrane. The polyurethane is allowed to cure under ambient conditions. Curing begins immediately and is complete within twenty-four hours. Longer cure times may be used but are unnecessary.

EXAMPLE 2—POLYURETHANE OF REDUCED VISCOSITY

If a somewhat less viscous polyurethane resin is desired, trialkyl citrate (alkyl having 1–5 carbons) is added to Component A and PAPI 94 (as above described) is added to Component B. The exact amounts of material in A and B are listed below:

Component A: A polyol (Isonol 93), 25.6 g; and triethyl citrate, 10.6 g.
Component B: a polyisocyanate prepolymer (Baytec MS.090), 100.0 g; and polyisocyanate mixture PAPI 94, 15 g. The Baytec MS.090 and PAPI 94 are mixed and heated (e.g., to 70° C.) to degas the mixture, then cooled to room temperature before mixing with Component A.

Component A and Component B are mixed and used in accord with the process of Example 1. Because the lower viscosity permits faster bead extrusion, we prefer this formulation for production work in the manufacture of permeable laminates.

The trialkyl citrate and polyol weight ratio in Component A is suitably about 1:2–3. The weight ratio of PAPI 94 and polyisocyanate prepolymer is suitably about 1:6–8.

EXAMPLE 3—THIXOTROPIC MODIFICATION

Other conventional additives can be used for specific modifications. In this Example a thixotropic agent is added to the formulation of Example 2. Thus, the amounts of material in A and B are:

Component A: a mixture of 96.0 g Isonol 93; 39.75 g triethyl citrate; and 2.71 g of a thixotropic additive commercially available as, "DT" from Bayer A.G. DT consists of diethyl toluene diamine (67%) in propylene carbonate (33%). Diethyl toluene diamine can also be used without a solvent.

Component B: a mixture of 200.0 g Baytec MS.090 and 30.0 g PAPI 94.

In making an adhesive composition from the above formulations, 31 g of Component A and 100 g of Component B are mixed.

A useful weight range of thixotropic additive:polyol plus trialkyl citrate is about 1:10–100.

Besides viscosity modifiers and thixotropic agents, other conventional additives may be used in the above formulations as appropriate, e.g., antioxidants, reinforcing agents, plasticizers, UV-stabilizers, pigments, fillers, corrosion inhibitors, drying agents, adhesion promoters, defoaming agents, etc., in amounts ranging from about 0.01 to about 25% by weight of the total composition.

Gas Permeation Module

An important embodiment of this invention comprises the use of the above described polyurethane adhesive to form laminates, especially laminates used in gas permeation modules for separation systems.

Various systems are available for separating gas streams into nearly pure individual components. Gas streams typically comprise hydrogen and lower hydrocarbons, with small amounts of aromatics (benzene, toluene, xylene, etc.), carbon oxides, hydrogen sulfide and water. For example, a gas mixture comprising mostly hydrogen, methane, ethane, ethylene, propane, propylene, butane, butene, etc., with small amounts of aromatics, can be separated into several mono-component streams. One well known method of accomplishing the separation of these components is to pass the stream through a series of gas permeation modules. Such modules comprise laminates made from thin gas-permeable sheets. These laminates usually are made from cellulose ester sheets (typically cellulose acetate) supported on nylon fabric. Typically the laminates are about 40 inches wide and are wound around a tubular support. The gas permeable sheet (e.g., cellulose ester) is considered the "active" component of the module because it effects the actual separation. It is thought that the separation is brought about by a process of gas adsorption and/or gas dissolution, combined with simple physical diffusion of gas molecules through the membrane.

Cellulose ester membranes other than those made from cellulose acetate have been used with varying degrees of success in gas separation modules, e.g., membranes comprising cellulose diacetate, cellulose triacetate, cellulose propionate, cellulose butyrate, cellulose cyanoethylate, cellulose methacrylate, and mixtures thereof. Accordingly, the above described polyurethane adhesive can be used with those membranes as well.

The nylon fabric support is also permeable but has little or no effect on selectivity. Nylon fabrics for permeate use usually contain about 90 threads per inch, but Fabrics woven with more than 90 or less than 90 threads/inch are also useful.

A wide variety of nylon types is available as fabric supports for laminates, including 6; 6,12; 4; 3; 7; 8; 11; 12; 4,6; 4,2; and others. Nylon 6—6 is typical, economical, and is preferred.

Referring now to the FIG. 1, there is shown in transverse cross section a typical preferred laminate useful in permeation separations. Layers of permeable membrane (e.g. cellulose acetate) 1 and 1a are cast according to well known methods onto layers of nylon fabric 3 and 3a respectively. The membranes adhere firmly to the nylon without need of added adhesive. The polyurethane adhesive described above is applied as beads along the length of the laminate, as shown in section at 5 and 5a. A coarse-mesh web 6 comprising polyethylene terephthalate is employed as a spacer to separate the two nylon fabrics 3 and 3a. Tight nylon-to-nylon contact tends to constrict passage of permeate molecules through the laminate; hence the spacer. Other useful spacers are known in the art, but will not be listed specifically herein.

For purposes of illustration, FIG. 1 shows spaces on both sides of the spacer 6. In actual use, especially when the laminate is wound around a supporting core, there are no spaces, and all layers lie in close planar contact with adjacent layers.

Although separate polyurethane beads are illustrated on opposite sides of the spacer at 5 and 5a and at 5b and 5c, the initial beads laid down at 5 and 5b are of sufficient volume that the polyurethane flows through the meshes of the edges of spacer 6 and is available at 5a and 5c without applying additional adhesive. (Presence of adhesive within the meshes of spacer 6 is not shown.) However, if desired, two sets of beads can be applied; e.g. first a set of beads such as 5 and 5b, then the spacer laid down, then apply a second set of beads 5a and 5c.

A gas permeation laminate unit thus consists of a sheet of conventional permeable membrane (e.g., cellulose acetate) cast on a layer of nylon fabric; a spacer (e.g., polyethylene terephthalate mesh); another layer of nylon fabric, and finally a second permeable membrane cast on that nylon layer. The two nylon layers are bonded together at their edges, with the adhesive penetrating the meshes of the spacer. Dimensions of permeate laminates vary widely; however, dimensions of 40 inches × 40 inches are typical.

Figure 2:
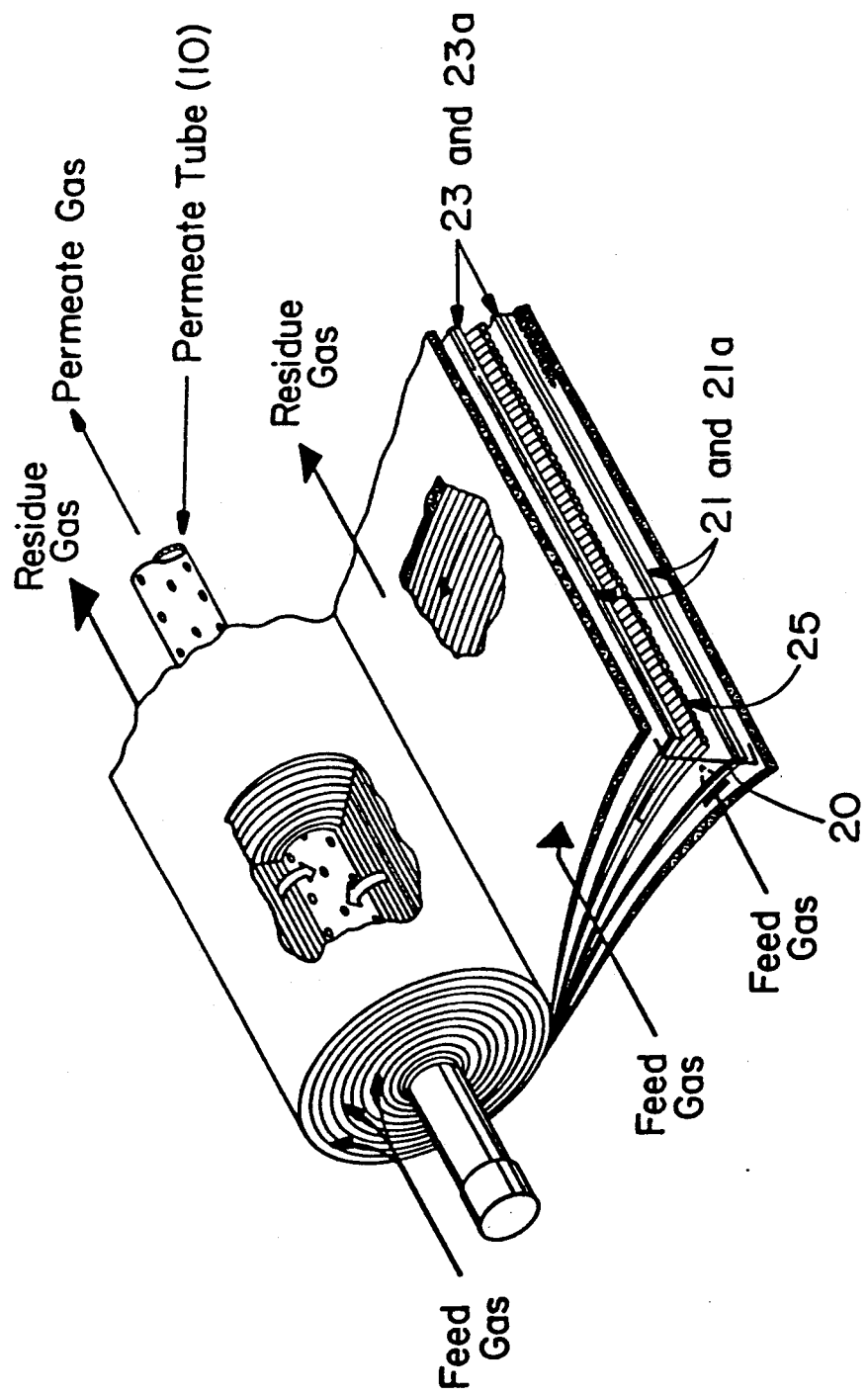
FIG. 2 illustrates a gas module in which the laminate in FIG. 1 is utilized.

FIG. 2 illustrates a complete gas permeation module subassembly. Specifically, one sheet of laminate 20 (or more, with typically 10-15 layers) is wrapped around a perforated metal tube 10. Laminate 20 is illustrated with its layers separated for clarity. Similar to the laminate illustrated in FIG. 1, the laminate comprises a spacer (25) on which two nylon-membrane layers are placed, with layers 21 and 21a representing the membrane layers and layers 23 and 23a representing the nylon layers. The resulting module assembly is then inserted into another perforated cylinder casing ("outer tube") which is capped at both ends by enclosing heads. (cylinder casing and enclosing heads are not illustrated) A complete module may be typically 40 inches long, and the outer casing may be 8 inches in outer diameter. Metal parts are generally made of carbon steel. The module also includes conventional fixtures, such as valves, and inlet and outlet ports for feed, permeate and residue.

Characteristics of Novel Adhesive

The harshest materials that the novel laminate adhesive encounters while using the laminate in a gas module are the aromatic components (typically toluene and xylene) of the gas stream. These materials appear as fine mists in the permeate streams and come in direct liquid contact with the laminate adhesive. Accordingly, swelling, cracking and dissolution of the adhesive in the presence of these materials is a vital concern. If the adhesive stands up well to these aromatics, it will generally endure the alkanes and alkenes in the separation streams.

In regards to aromatic resistance, several polyurethane adhesives sold commercially for permeation module use were compared with the adhesives described in Examples 1-3. The results given in the Table below show that the adhesives in Examples 1-3 are generally equal to the commercial polyurethanes in peel strength, but are greatly superior in resistance to aromatic components as well as hexane.

TABLE

| | POLYURETHANE PROPERTIES | | | |
|---|---|---|---|---|
| | Chemical Resistance (% Dimensional Linear Increase) | | | Peel Strength |
| Resin | Toluene | Xylene | Hexane | (PLI) |
| Example 1 | 3.33 | 0.7 | 0.0 | 7.7 |
| Example 2 | 4.36 | 1.36 | 0.0 | 9.7 |
| Example 3 | 2.59 | 0.72 | 0.0 | 7.3 |
| HBF | 31.71 | 28.81 | 2.63 | 4.2 |
| FPS | 27.0 | 22.2 | 3.0 | 8.0 |
| ASH | 15.15 | 15.63 | 3.7 | 2.7 |

Note:
Resins "HBF", "FPS", and "ASH" are commercial 2-component polyurethanes sold for permeate module manufacture. All resins had a pot life of at least 45 minutes except "ASH", which had a pot life of 15 minutes.

Testing Procedures for the Table

Substrate: Woven nylon fabric, 90 threads/inch.

Application: A well mixed mixture of Components A and B was applied to a laminate of nylon fabric and a cellulose acetate membrane. A second laminate is then laid down on the first laminate to form a thin sandwich. The thickness of the glue bead varies from 0.1 to 0.5 mm.

Peel Strength Measurements: A sandwich made by the above procedure was cured at room temperature for two days. Three test specimens of size 1"×6" were prepared using a standard cutting tool. Peel strength was measured with Instron tester by pulling apart substrates in 180° angle. The pulling speed was 1"/min. over a seven minute period. Peel strength was measured in pounds per linear inch units (PLI).

Chemical Resistance: A polyurethane pancake having a thickness of about 2 mm was prepared from a batch of well mixed adhesive. The pancake was then left for two days at room temperature in order to cure the adhesive. Sections measuring 2"×0.5" were cut from the pancake and soaked in organic solvents such as hexane, toluene, and xylene. Soaking was carried out at room temperature for 24 hours. The sections were then taken out of the solvents and linear dimensional increase was measured while the sections were wet. Exposure of the polyurethane causes swelling to the extent indicated in the Table.

Other Uses

Applications other than a nylon adhesive should be noted. For instance, the polyurethane composition can be used as protective coatings for substantially any substrate, including a wide variety of plastics, metals (steel, copper, aluminum, etc.), fabrics, paper, etc. It is useful, as an auto underbody coating, as a bridge deck membrane (on concrete), as an anti-graffiti coating, as well as an adhesive for bonding two or more substrates together, e.g. metal to metal, metal to plastic, paper to paper, paper to plastic or metal, plastic to plastic and so on.

Herein, percentages and ratios are by weight unless otherwise stated.

We claim:

1. Laminate comprising at least one permeable membrane layer and at least one nylon fabric layer wherein said laminate is bordered with an adhesive comprising a polyurethane consisting essentially of two separate components, A and B wherein, Component A comprises a polyol having at least about 95 mol % $C_2H_5C(R)_3$ and about 0-5 mol % $C_2H_5C(R')(R_2)$, wherein R is $-CH_2-O-CH_2CH_2OH$ and R' is $-CH_2O-CH_2-O-CH_2CH_2-OH$; and Component B comprises a polyisocyanate prepolymer, $R''-CH_2CH_2[O-C(:O)(CH_2)_4C-(:O)-O-CH_2CH_2]_n-R''$, wherein R'' is

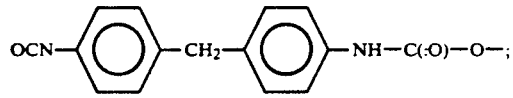

n is about 2-4; and the weight ratio of A:B being about 1:2-7.

2. Laminate according to claim 1 wherein Component A additionally includes trialkyl citrate wherein said trialkyl has one to five carbons and A has a citrate:-polyol weight ratio of about 1:2-3; and Component B additionally includes a polyisocyanate mixture consisting essentially of about 60%-70% by weight Component (i) and about 30%-40% by weight Component (ii), wherein (i) comprises a mixture of about 88% by weight of 4,4'-diphenylmethane diisocyanate and about 12% 2,4'-diphenylmethane diisocyanate; and (ii) is a polymer of the formula,

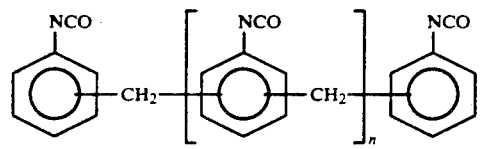

having a functionality of 2.3, wherein n is a variable between 1 and 8.

3. Laminate according to claim 2 wherein in parts by weight Component A consists essentially of 25.6 parts polyol and 10.6 parts triethyl citrate; and Component B consists essentially of 100 parts of said polyisocyanate prepolymer and 15 parts of said polyisocyanate mixture of (i) and (ii).

4. Laminate according to claim 2 wherein Component A additionally includes a thixotropic additive, the weight ratio of said additive to the combined weights of polyol and trialkyl citrate being about 1:10-100.

5. Laminate according to claim 4 wherein said thixotropic additive is diethyl toluene diamine.

6. Process of making a gas permeation module comprising (a) forming a laminate from at least one permeable membrane layer and at least one nylon fabric layer wherein said laminate is bordered with an adhesive, (b) adhering at least one laminate from (a) to a spacer element to form a gas permeation laminate, (c) wrapping said gas permeation laminate around a supporting core, (d) placing said wrapped core into a cylinder casing to form said permeation module wherein the adhesive in (a) comprises a polyurethane consisting essentially of two separate components, A and B wherein, A comprises a polyol comprising at least about 95 mol % $C_2H_5C(R)_3$ and about 0-5 mol % $C_2H_5C(R')(R)_2$, wherein R is $-CH_2-O-CH_2CH_2OH$ and R' is $-CH_2O-CH_2-CH_2-O-CH_2CH_2-OH$; and B comprises a polyisocyanate prepolymer, $R''-CH_2CH_2[O-C(:O)(CH_2)_4C-(:O)-O-CH_2CH_2]_n-R''$, wherein R'' is

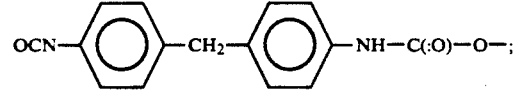

n is about 2-4; and the weight ratio of A:B being about 1:2-7.

7. Process according to claim 6 wherein Component A additionally includes trialkyl citrate wherein said trialkyl has one to five carbons and A has a citrate:-polyol weight ratio of about 1:2-3; and Component B additionally includes a polyisocyanate mixture consisting essentially of about 60%-70% by weight Component (i) and about 30%-40% by weight Component (ii), wherein (i) comprises a mixture of about 88% by weight of 4,4'-diphenylmethane diisocyanate and about 12% 2,4'-diphenylmethane diisocyanate; and (ii) is a polymer of the formula,

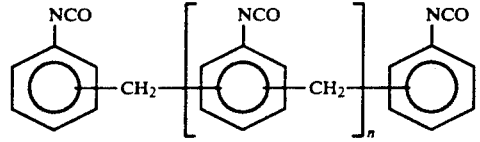

having a functionality of 2.3, wherein n is a variable between 1 and 8.

8. Process according to claim 7 wherein in parts by weight, Component A consists essentially of 25.6 parts polyol and 10.6 parts triethyl citrate; and Component B consists essentially of 100 parts of said polyisocyanate prepolymer and 15 parts of said polyisocyanate mixture of (i) and (ii).

9. Process according to claim 7, wherein Component A additionally includes a thixotropic additive, the weight ratio of said additive to the combined weights of said polyol and trialkyl citrate being about 1:10-100.

10. Process according to claim 9, wherein said thixotropic agent is diethyl toluene diamine.

11. A gas permeation module comprising a product from a process according to claim 6, 7, 8, 9 or 10.

* * * * *